US011942290B2

(12) United States Patent
Brauner et al.

(10) Patent No.: US 11,942,290 B2
(45) Date of Patent: Mar. 26, 2024

(54) VACUUM INTERRUPTER

(71) Applicant: Siemens Aktiengesellschaft, Munich (DE)

(72) Inventors: Thomas Brauner, Berlin (DE); Frank Graskowski, Wandlitz (DE); Klaus Schachtschneider, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/263,443

(22) PCT Filed: Dec. 2, 2021

(86) PCT No.: PCT/EP2021/083860

§ 371 (c)(1),
(2) Date: Jul. 28, 2023

(87) PCT Pub. No.: WO2022/161665

PCT Pub. Date: Aug. 4, 2022

(65) Prior Publication Data

US 2024/0038467 A1 Feb. 1, 2024

(30) Foreign Application Priority Data

Jan. 28, 2021 (DE) ..................... 10 2021 200 785.6

(51) Int. Cl.
*H01H 33/662* (2006.01)

(52) U.S. Cl.
CPC ................. *H01H 33/66238* (2013.01); *H01H 2033/66246* (2013.01)

(58) Field of Classification Search
CPC ............... H01H 33/66238; H01H 2033/66246
USPC ........................................................ 218/140
See application file for complete search history.

(56) References Cited

U.S. PATENT DOCUMENTS 4,071,727 A * 1/1978 Crouch ............ H01H 33/66238 218/135
4,492,837 A * 1/1985 Crouch .................. H01H 33/66 218/135
5,510,592 A * 4/1996 Gentsch ........... H01H 33/66238 218/135

FOREIGN PATENT DOCUMENTS

| | | | |
|---|---|---|---|
| DE | 19519419 | A1 | 11/1996 |
| DE | 10220110 | A1 | 11/2003 |
| DE | 102008018531 | B3 | 9/2009 |
| GB | 677776 | A | 8/1952 |
| JP | S5828119 | A | 2/1983 |
| JP | 2004241373 | A | 6/2004 |

* cited by examiner

*Primary Examiner* — Kevin J Comber
(74) *Attorney, Agent, or Firm* — Laurence A. Greenberg; Werner H. Stemer; Ralph E. Locher

(57) ABSTRACT

A vacuum interrupter has a cover base formed with an insertion opening for an axially movable moving contact rod carrying a moving contact. The moving contact rod is routed out of the vacuum interrupter in a vacuum-tight manner by way of a bellows. The bellows has a centering appendage which is formed by a tubular end piece of the bellows that runs parallel to the longitudinal axis of the bellows and is inserted into the insertion opening. The bellows moreover has a bellows base which is disposed on the centering appendage, runs substantially transversely to the longitudinal axis of the bellows, and is formed with a through-opening for the moving contact rod.

15 Claims, 6 Drawing Sheets

VACUUM INTERRUPTER

FIELD AND BACKGROUND OF THE INVENTION

The invention relates to a vacuum interrupter.

In the case of a vacuum interrupter, it is customary to seal the transition from the moving contact rod carrying the moving contact to the housing of the vacuum interrupter in a vacuum-tight manner by means of a metal bellows. It is known to solder a first end of the bellows to a housing flange of the vacuum interrupter and the other end of the bellows to the moving contact rod. The moving contact rod is also referred to in the technical literature as a moving contact connecting bolt, switching rod, drive rod or contact rod.

U.S. Pat. No. 4,071,727 A (Crouch et al.) Jan. 31, 1978 describes that an upper end 32 of the bellows 30 is connected to the moving contact rod 26 and a lower end 33 of the bellows 30 is fixed to an inner periphery of an end cap 15 of the housing. Provided for guiding the moving contact rod 26 during switching operations is a guide device 35 consisting of a metal bushing 36 surrounding the moving contact rod 26 with plastic inserts 40, 42 and a radially outwardly extending flange 38 at the lower end of the metal bushing 36, which is centered and fixed to the end cap 15 by means of a screw device.

DE 102 20 110 A1 (ABB Patent GmbH), Nov. 13, 2003, describes a bellows 33 disposed between a housing cover 24 and a support collar 32 of a contact rod 30, which seals the interior of a vacuum interrupter chamber 10 from the outside in a gas-tight manner and is fixed on an end face of a base 27 of the housing cover 24.

DE 10 2008 018 531 B3 (Siemens AG), Sep. 17, 2009, describes a connection of a bearing 12 of the drive rod 10 to a housing cover 9 by means of a latching hook 22.

Since the issues of fixing the bearing of the moving contact rod and the connection and centering of the bellows on the cover base are linked, there is always a need for constructive solutions that allow the moving contact rod to be mounted and the bellows to be fixed easily and inexpensively.

SUMMARY OF THE INVENTION

It is therefore the object of the present invention to provide a corresponding vacuum interrupter.

According to the invention, this object is achieved by the vacuum interrupter as claimed. Advantageous design embodiments of the vacuum interrupter according to the invention are the subject matter of the dependent claims.

The vacuum interrupter has an interrupter chamber which is enclosed by a housing and in which a fixed contact and a moving contact are disposed. The moving contact sits at one end of a moving contact rod, which is guided out of the vacuum interrupter in an axially movable manner. The moving contact can be moved relative to a fixed contact by an axial movement of the moving contact rod. The moving contact rod runs in a vacuum-tight manner through a cover of the housing; to this end, the cover has in its cover base an insertion opening through which the moving contact rod is guided.

The lead-through of the moving contact rod through the insertion opening in the cover base is kept vacuum-tight by means of metal bellows. The bellows is a metallic corrugated tube which, due to its large number of corrugations, can be axially stretched and compressed, so that the axial movement of the moving contact rod required during switching operations of the vacuum interrupter is made possible without jeopardizing the vacuum tightness in the region where the moving contact rod passes through the cover base.

The bellows has a centering appendage which is formed by a tubular end piece of the bellows running parallel to the longitudinal axis of the bellows. The centering appendage is inserted into the insertion opening and in this way centers the bellows in relation to the cover base.

The bellows has a bellows base. The bellows base is disposed on the centering appendage, in particular at the end of the centering appendage. The bellows base has a through-opening through which the moving contact rod is guided.

The invention makes use of the fact that technologies are now available in which a bellows is not made from a tube but from a sleeve having a base. Thus, the bellows has a bellows base in which a through-opening can be produced with a suitable shape in a simple way, for example by stamping or laser cutting. There are various known methods for producing a sleeve which has a base, such as deep drawing, for example.

The bellows base can be used to hold and fasten a bearing of the moving contact rod, while at the same time the centering and fastening of the bellows to the cover base can take place by means of the centering appendage and the last corrugation of the bellows. In this way, an additional device for centering the bellows, such as a bearing cap, for example, is no longer required. The invention thus offers an inexpensive and simple solution for mounting the moving contact rod and for fixing the bellows.

According to a preferred embodiment of the invention, the bellows base runs substantially transversely to the longitudinal axis of the bellows. The bellows base in all its regions does not have to run exactly at 90 degrees to the longitudinal axis of the bellows, but angular deviations are possible according to the production-related tolerances. In this way, the bellows base forms a contact and mounting face for other parts that are to be mounted on the vacuum interrupter, e.g. for a bearing of the moving contact rod that bears on the bellows base. Since the bellows is made from a sleeve having a base, the bellows base extends substantially transversely to the longitudinal axis of the bellows, without further forming steps having to be carried out.

According to a preferred embodiment of the invention, the bellows is made so as to be integral to the bellows base, i.e. in one piece. In doing so, use is made of the fact that technologies are now available in which a bellows is not made from a tube but from a sleeve with a base. Thus, the bellows has a bellows base. It also avoids seams that can lead to gas leaks. There are various known methods for producing a sleeve which has a base, such as deep drawing, for example.

According to a preferred embodiment of the invention, the through-opening in the bellows base has a smaller internal diameter than the insertion opening in the cover base. Thus, the bellows base, the extent of which is determined by the difference in diameter, can be used to fix a bearing of the moving contact rod.

According to a preferred embodiment of the invention, the centering appendage has an external diameter which corresponds to the internal diameter of the insertion opening in the cover base. In this way, the centering appendage fits snugly into the insertion opening without any appreciable play, thereby allowing the bellows to be accurately centered with respect to the cover.

According to a preferred embodiment of the invention, the bellows is connected to the cover base on the external circumference of the centering appendage and/or in the region of that flank of the last bellows corrugation before the centering appendage that runs out to the centering appendage. This enables reliable fixing and vacuum-tight connection of the bellows to or on the cover.

According to a preferred embodiment of the invention, a bearing serving to guide the moving contact rod is inserted into the through-opening in the bellows base and fastened therein. Thus, the bellows base can be used to fix a bearing of the moving contact rod. Because the bellows base can be used to receive and fasten a bearing of the moving contact rod, centering the bellows relative to the housing cover can simultaneously center the bearing relative to the housing cover; the centering accuracy, which was previously determined by two independent centering steps—i.e. centering the bellows and centering the bearing—can be improved by the reduction to a single centering step made possible according to the invention, specifically centering the bellows relative to the housing cover.

According to a preferred embodiment of the invention, the through-opening in the bellows base has protrusions and recesses and the bearing has on its external circumference a contour that corresponds to the protrusions and recesses, so that the bearing provided for guiding the moving contact rod is inserted into the through-opening in the manner of a bayonet fastener and can be fixed to the bellows base. A bayonet fastener is a mechanical connection that can be established and released quickly.

A bearing provided for guiding the moving contact rod can also be fixed to the bellows base by other mechanical connections between the bearing and the bellows base that are provided in addition to or as an alternative to the bayonet fastener, e.g. by a snap-fit connection. A snap-fit connection can be implemented, for example, by a snap-fit mechanism comprising a snap-in hook and/or snap-in cams.

According to a preferred embodiment of the invention, the bellows has a bellows bushing in the form of a tubular appendage which serves as a bearing for the moving contact rod. The construction is further simplified by integrating the bearing of the moving contact rod into the bellows. In order to produce the bellows bushing, the bellows base can be formed in such a way that a kind of extension of the bellows is created; this extension in the form of a bellows bushing can now assume the function of a bearing, which serves to guide and position the moving contact rod. A separate bearing, which is to be disposed as a separate part on the bellows, can be omitted entirely.

According to a preferred embodiment of the invention, the bellows bushing, which acts as a bearing for the moving contact rod, is connected to the bellows base. This can be achieved in that the bellows bushing is formed by forming central regions of the bellows base. However, alternative design embodiments are also possible, according to which the bellows base is designed as a separate component which is connected to the bellows base, e.g. by soldering/brazing.

According to a preferred embodiment of the invention, the bellows with the bellows base and the bellows bushing are made integrally, i.e. in one piece. This is possible more easily and more inexpensively, e.g. by means of deep drawing, than by producing the bellows comprising the bellows base and the bellows bushing by way of connecting two or more parts. In doing so, use is made of the fact that technologies are now available in which a bellows is not made from a tube but from a sleeve with a base. The bellows thus has a bellows base from which the bellows bushing can also be made by forming. In addition, by manufacturing a bellows comprising the bellows base and the bellows bushing from one piece, seams that may lead to gas leaks are avoided.

According to a preferred embodiment of the invention, the internal circumference of the bellows bushing has one or a plurality of sliding bushes, which serve as sliding bearings for the moving contact rod. If the bellows bushing that forms the bearing of the moving contact rod is formed from a metallic material, e.g. the metal of the bellows, sliding bushings, for example made of plastic, in particular a plastics material with good sliding properties such as, for example, polytetrafluoroethylene, or, for short, PTFE, improve the sliding capacity of the bearing. This has the advantage that the axial mobility of the moving contact rod is improved.

The above-described properties, features and advantages of this invention and the manner in which they are achieved become more clearly and easily comprehensible by way of the following description of the drawings. In the drawings, in a schematic illustration that is not true to scale:

DETAILED DESCRIPTION OF THE INVENTION

Figure 1:
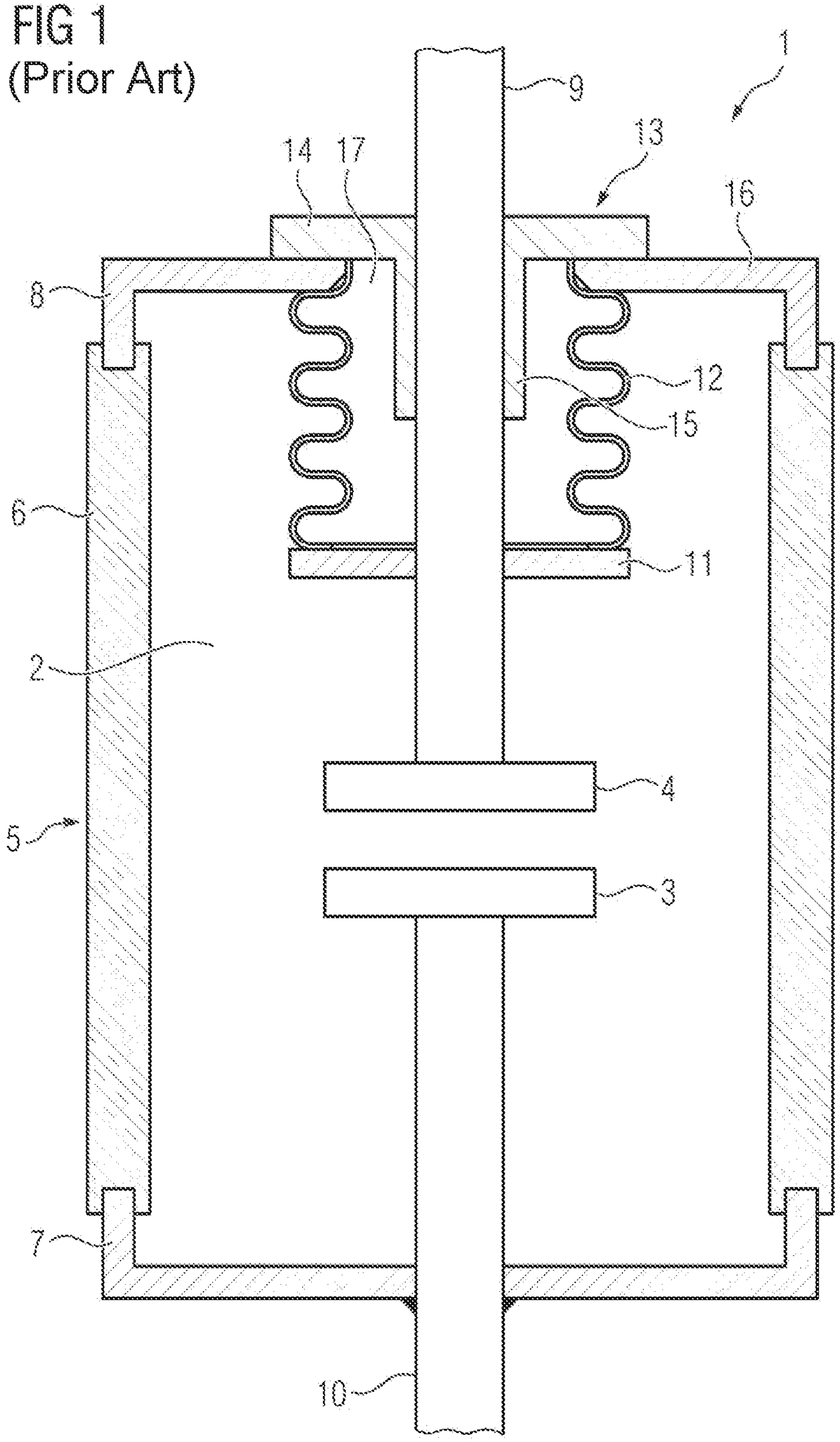
FIG 1 (Prior Art)
FIG. 1 shows a sectional view of a known vacuum interrupter.

FIG. 1 shows a vacuum interrupter 1 known in the prior art with an interrupter chamber 2 enclosed by a housing 5, in which are disposed a fixed contact 3 and a moving contact 4. The fixed contact 3 is located at one end of a fixed contact rod 10, which is vacuum-tight by virtue of a first metallic cover 7, for example is routed out of the vacuum interrupter 1 by soldering fixed contact rod 10 and cover 7. The moving contact 4 sits at one end of a moving contact rod 9, which is guided in a displaceable and non-rotatable manner by means of a bearing 13, the latter being fixed to a second cover 8, and is routed out of the vacuum interrupter 1 through the second cover 8. By means of the moving contact rod 9, the moving contact 4 can be brought into contact with the fixed contact 3 in a closing process and moved to a spacing from the fixed contact 3 in an opening process. The covers 7, 8 together with an insulating material cylinder 6 disposed between them, which can be made of ceramic material, form the vacuum-tight housing 5 of the vacuum interrupter 1.

The lead-through of the moving contact rod 9 through the second cover 8 is kept vacuum-tight by means of a metal bellows 12, the first end of which is attached to an internal circumference of a circular insertion opening 17, which is disposed in a cover base 16 of the second cover 8, and the second end of which is connected to a projection 11, designated as bellows cap, of the moving contact rod 9, e.g.

by soldered/brazed connections. The bearing 13 comprises a perforated disk-shaped bearing flange 14 and a tubular guide part 15 which is attached concentrically to the bearing flange 14 and is connected to the latter; the bearing 13 may be made integrally. The bearing 13 can be made of plastics material. The bearing flange 14 is centered and fixed to the cover base 16, e.g. with the aid of a threaded connection as shown in U.S. Pat. No. 4,071,727A (Crouch et al.), or with the aid of a bearing cap as shown in FIG. 2.

Figure 2:
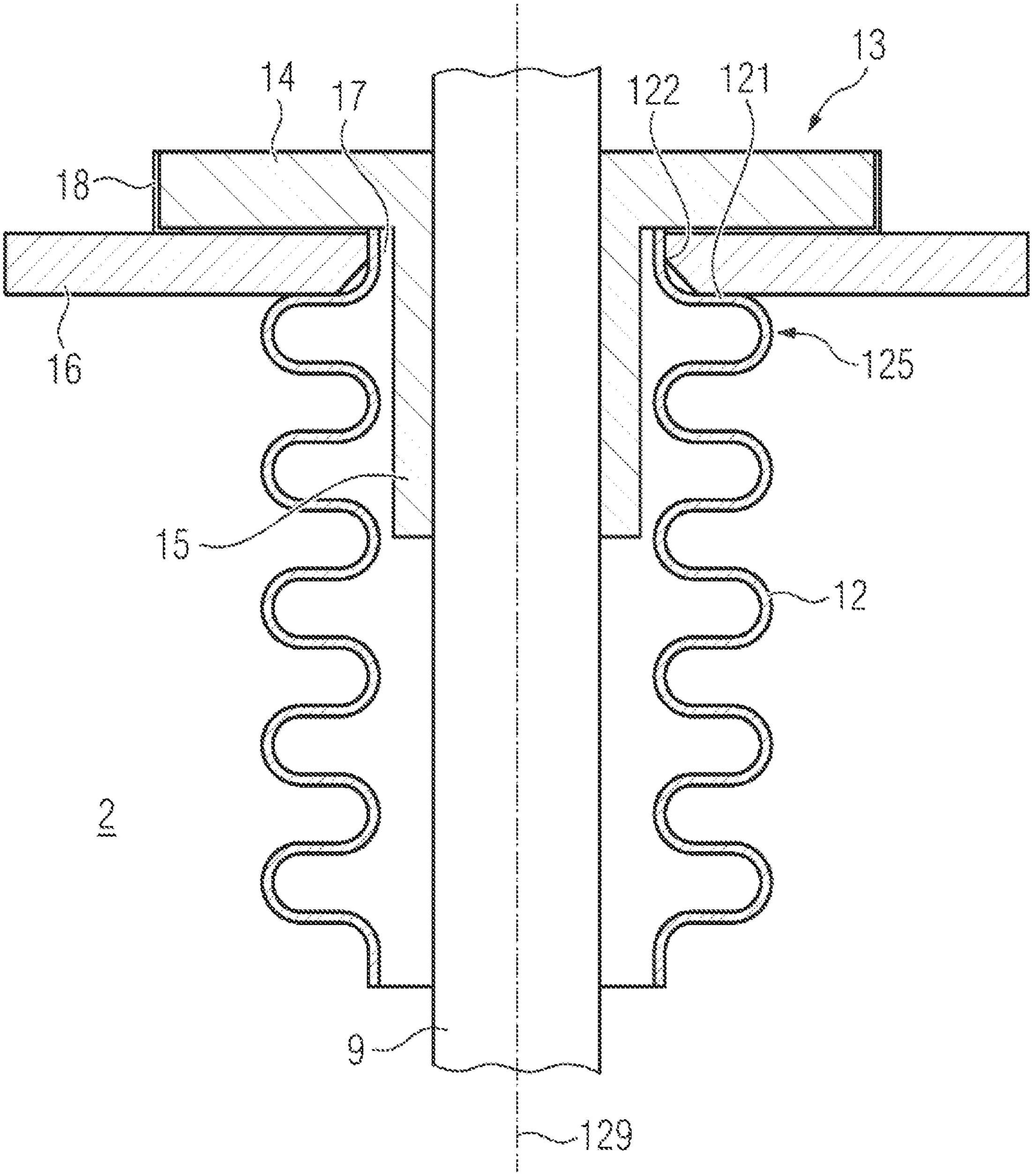
FIG 2 (Prior Art)
FIG. 2 shows a sectional view of a connection of a bellows according to a first known design embodiment.

FIG. 2 shows a sectional view of a connection of a bellows 12 according to a first known design embodiment. A cover base 16 has a circular insertion opening 17 which is enclosed by a circular encircling edge of the cover base 16. Inserted into the insertion opening 17 of the cover base 16 is a guide part 15 of a bearing 13 of a moving contact rod 9, which comprises a bearing flange 14 and the guide part 15, as illustrated in FIG. 1. The bellows 12 has a centering appendage 122 formed by a tubular end piece of the bellows 12 that runs parallel to the longitudinal axis 129 of the bellows 12. The external circumference of the centering appendage 122 bears on the circular encircling edge of the cover base 16, which encloses the insertion opening 17 of the cover flange 16. In this way, the bellows 12 is centered relative to the insertion opening 17 of the cover base 16. For fixing, the bellows 12 is soldered/brazed to the cover base 16 in the regions of the centering appendage 122 and a flank 121 of the last bellows corrugation 125 before the centering appendage 122 that runs out to the centering appendage 122. Although this design embodiment allows simple centering of the bellows 12 relative to the cover base 16, it does mean that, for the purpose of fixing the bearing flange 14 to the cover base 16, another component, e.g. a threaded device or, as shown in FIG. 2, a bearing cap 18 attached to the cover base 16, in which the bearing flange 14 and thus the bearing 13 are inserted and held so as not to be displaceable, is required.

Figure 3:
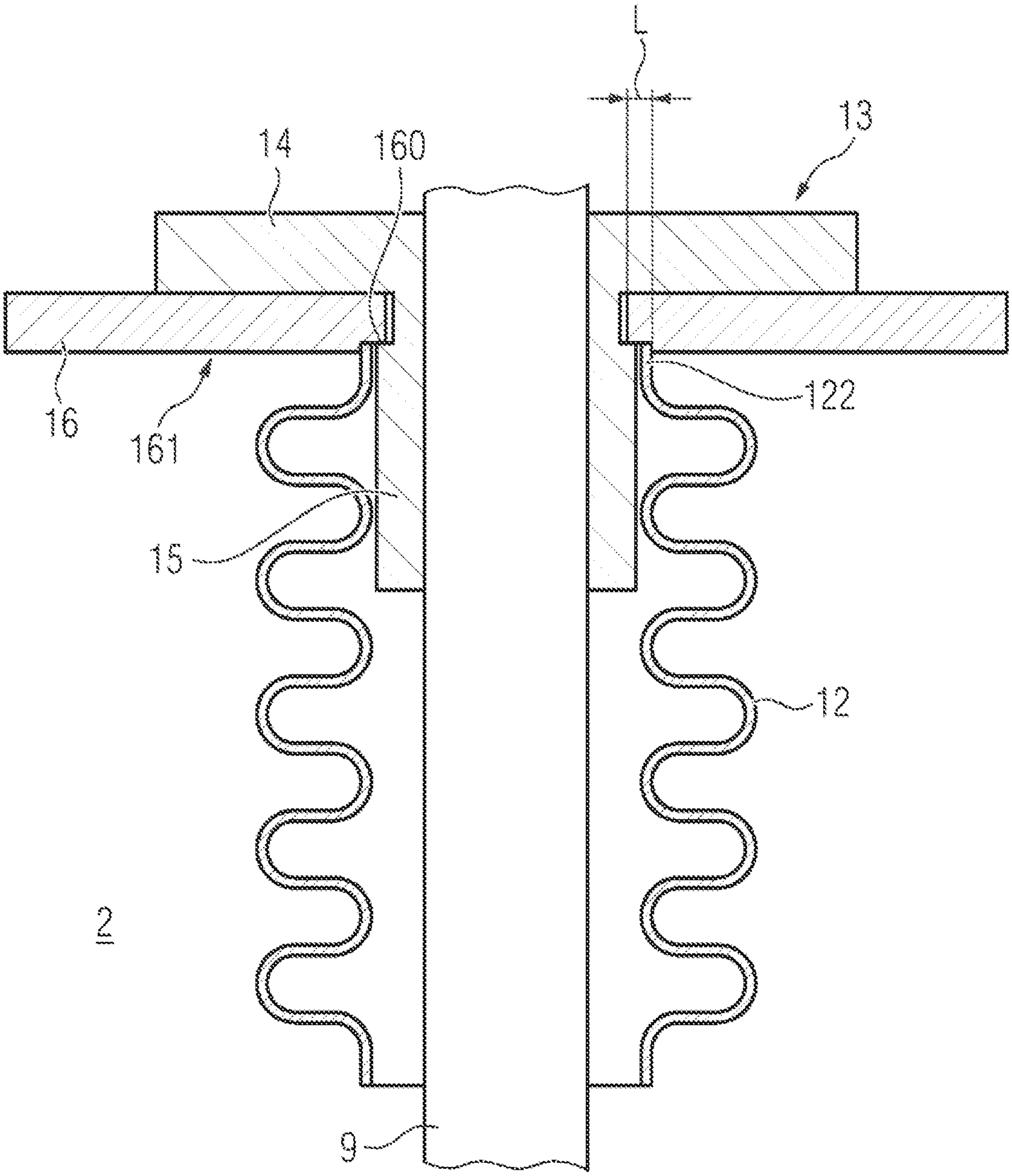
FIG 3 (Prior Art)
FIG. 3 shows a sectional view of a connection of a bellows according to a second known design embodiment.

FIG. 3 shows a sectional view of a connection of a bellows 12 according to a second known embodiment, in which the bellows 12 is configured as in FIG. 2. As in the design embodiment shown in FIG. 2, the cover base 16 also in this design embodiment has a circular insertion opening 17 which is enclosed by a circular encircling edge of the cover base 16. In contrast to the design embodiment shown in FIG. 2, the end face 161 of the cover base 16 in the design embodiment illustrated in FIG. 3, has along its edge that encloses the insertion opening 17, a shoulder with a recess that forms a radial width L and has been generated by a subtractive manufacturing method, for example. In the region of the recess, the cover base 16 has a smaller thickness than outside of this region. The annular face 160 of the cover base 16 formed by the recess and offset from the level of the end face 161 forms a centering face 160 on which the end, more precisely the end side, of the centering appendage 122 of the bellows 12 bears. The external circumference of the centering appendage 122 bears on an edge that forms a shoulder between the centering surface 160 and the end face 161 of the cover base 16. The bellows 12 in the region of this edge and/or in the region of the centering face 160 is soldered/brazed to the cover flange 16. This type of centering of the bellows 12 is more complex than the type shown in FIG. 2, but has the advantage that the cover base 16 can extend further in the direction of the moving contact rod 9, specifically by the radial width L beyond the external circumference of the centering appendage 122 of the bellows 12 inwards in the direction of the longitudinal axis 129 of the bellows 12. The accessibility of the edge of the cover base 16 enclosing the insertion opening 17 and the independence of the design of this edge from the shape of the centering appendage 122 of the bellows 12 opens up the possibility of attaching the bearing 13 to the cover base 16 in a different way than in the embodiment shown in FIG. 2, e.g. by a bayonet fastener or by a snap-in hook, potentially made of plastics material, as shown in DE 10 2008 018 531 B3.

Figure 4:
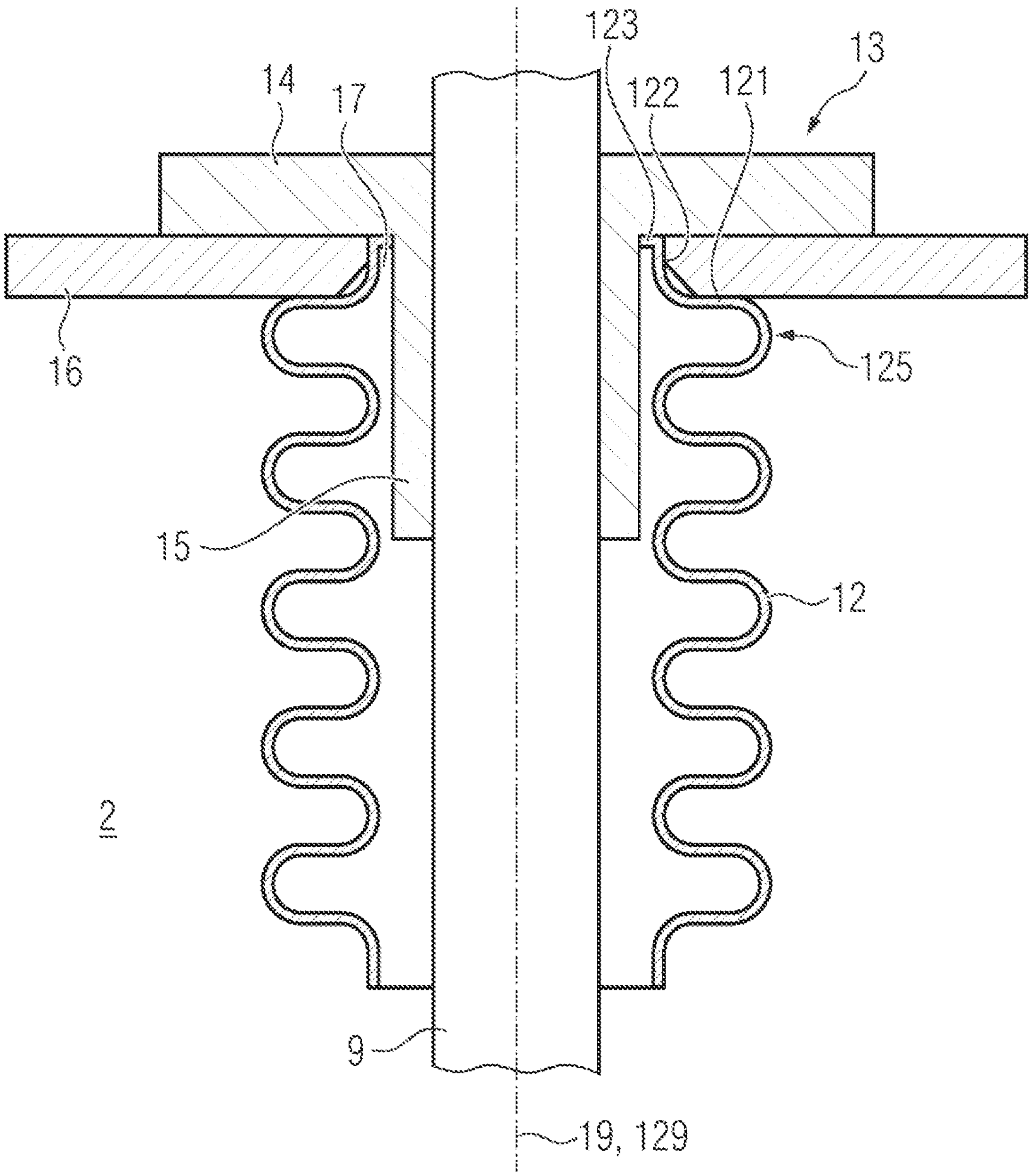
FIG. 4 shows a sectional view of a connection of a bellows according to a first design embodiment of the invention.

FIG. 4 shows a sectional view of a connection of a bellows according to a first design embodiment of the invention. Aside from the elements shown in FIGS. 2 and 3, the bellows 12 additionally has a bellows base 123 which terminates the centering appendage 122 and has a through-opening 126 that is generated by stamping or laser cutting, for example, cf. FIG. 5. The centering and fixing of the bellows 12 on and to the cover base 16 takes place, as shown in FIG. 2, by the cylindrical centering appendage 122, to which the bellows base 123 is attached, and the flank 121 of the last bellows corrugation 125, which runs out to the centering appendage 122. In order to fix the bellows 12 in such a way that the longitudinal axis 19 of the moving contact rod 9 coincides with the longitudinal axis 129 of the bellows 12, the bellows 12 is soldered/brazed to the cover base 16 in the region of the centering appendage 122 and/or in the region of the flank 121 of the last bellows corrugation 125 before the centering appendage 122 that runs out to the centering appendage 122.

The region of the bellows base 123 of the bellows 12 enclosing the through-opening 126 assumes the function of the cover base 16 from FIG. 3, drawn inwards beyond the external circumference of the centering appendage 122 of the bellows 12, and enables the bearing 13 to be fastened to the bellows base 123 of the bellows 12. An additional component for fixing the bearing flange 14 to the cover flange 16, e.g. a threaded device or a bearing cap, is therefore not required.

Figure 5:
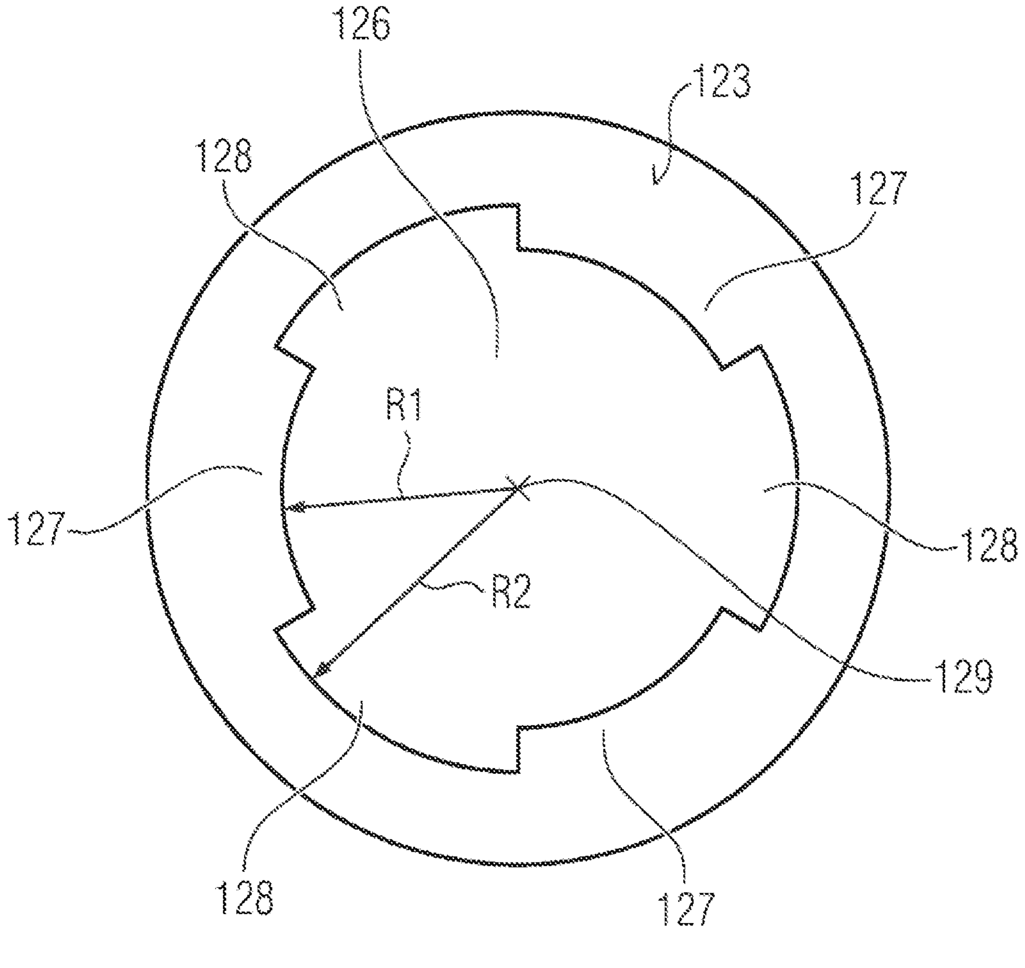
FIG. 5 shows a plan view from above of a bellows base.

FIG. 5 shows a plan view from above of a bellows base 123 which has a through-opening 126 and by way of which a bayonet fastener can be implemented. Distributed in 60-degree segments along the circumference of the through-opening 126, there are alternating three protrusions 127 and three recesses 128 of the edge of the bellows base 123 that encloses the through-opening 126, whereby the protrusions and recesses are viewed in relation to the longitudinal axis 129 of the bellows 12, and the protrusions 127 have a first radius R1, and the recesses 128 have a second radius R2 which is greater than the first radius R1 measured from the longitudinal axis of the bellows 12. The bearing 13, which has on the external circumference of its guide part 15 a contour that corresponds to the protrusions and recesses 127, 128, can be inserted into the through-opening 126 and can be mechanically connected to the bellows 12 (=bayonet fastener) by way of a rotation about the longitudinal axis 129 of the bellows 12 relative to the bellows 12.

Figure 6:
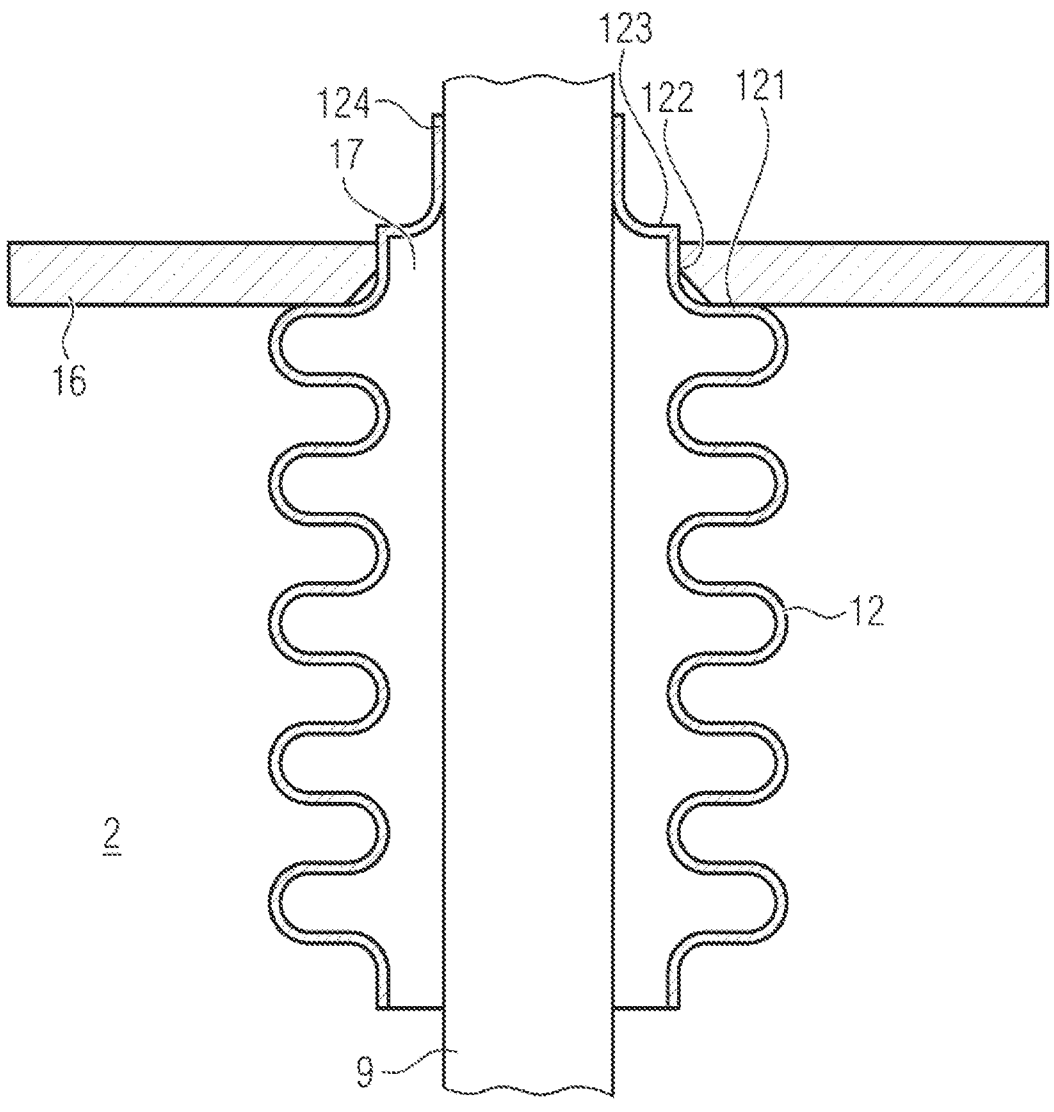
FIG. 6 shows a sectional view of a connection of a bellows according to a second design embodiment of the invention.

FIG. 6 shows a sectional view of a connection of a bellows according to a second design embodiment of the invention. In comparison to the design embodiment of the bellows 12 shown in FIG. 4, the bellows 12 has been formed even more extensively here, so that the bellows 12 has a bellows bushing 124 in the form of a tubular appendage so as to adjoin the bellows base 123 extending transversely to the longitudinal axis 19 of the bellows 12. This bellows bushing 124 assumes the function of a bearing for the moving contact rod 9, i.e. the guidance and positioning of the moving contact rod 9 by allowing the moving contact rod 9 to slide along an inner wall of the bellows bushing 124. Since in this way the bellows 12 per se forms the bearing of the moving contact rod 9, a separate bearing for the moving contact rod 9, as required in the design embodiment shown in FIG. 4, is unnecessary.

The invention claimed is:

1. A vacuum interrupter, comprising:

a cover base formed with an insertion opening for an axially movable moving contact rod which carries a moving contact;

a bellows disposed to rout the moving contact rod out of the vacuum interrupter in a vacuum-tight manner;

said bellows having a centering appendage formed by a tubular end piece of said bellows, said tubular end piece extending parallel to a longitudinal axis of said bellows and being inserted into said insertion opening; and said bellows having a bellows base disposed on said centering appendage and being formed with a through-opening for the moving contact rod.

2. The vacuum interrupter according to claim 1, wherein said bellows base runs substantially transversely to the longitudinal axis of said bellows.

3. The vacuum interrupter according to claim 1, wherein said bellows base is disposed at an end of said centering appendage.

4. The vacuum interrupter according to claim 1, wherein said bellows is formed from a sleeve comprising said bellows base.

5. The vacuum interrupter according to claim 1, wherein said through-opening in said bellows base is a punched opening formed by punching or a laser-cut opening formed by laser cutting.

6. The vacuum interrupter according to claim 1, wherein said bellows is formed integrally in one piece with said bellows base.

7. The vacuum interrupter according to claim 1, wherein said through-opening in said bellows base has a smaller internal diameter than a diameter of said insertion opening in said cover base.

8. The vacuum interrupter according to claim 1, wherein said centering appendage has an external diameter equal in value with an internal diameter of said insertion opening in said cover base.

9. The vacuum interrupter according to claim 1, wherein said bellows is connected to said cover base via at least one of an external circumference of said centering appendage or a flank of a bellows corrugation that forms a last bellows corrugation adjoining said centering appendage and that runs out to said centering appendage.

10. The vacuum interrupter according to claim 1, which further comprises a bearing for guiding said moving contact rod, said bearing being inserted into said through-opening in said bellows base and fastened therein.

11. The vacuum interrupter according to claim 10, wherein said through-opening in said bellows base is formed with protrusions and recesses and said bearing has an external circumference with a contour that corresponds to said protrusions and recesses, thus enabling said bearing to be inserted into said through-opening as a bayonet fastener and affixed to said bellows base.

12. The vacuum interrupter according to claim 1, wherein said bellows further comprises a bellows bushing in a form of a tubular appendage forming a bearing for the moving contact rod.

13. The vacuum interrupter according to claim 12, wherein said bellows is formed integrally in one piece with said bellows base and said bellows bushing.

14. The vacuum interrupter according to claim 12, wherein said bellows bushing adjoins said bellows base.

15. The vacuum interrupter according to claim 12, wherein said bellows bushing comprises one or a plurality of sliding bushings on an internal circumference thereof, forming sliding bearings for the moving contact rod.

* * * * *